United States Patent
Dewan et al.

(10) Patent No.: US 7,269,603 B1
(45) Date of Patent: Sep. 11, 2007

(54) ENTERPRISE NAMING SERVICE SYSTEM AND METHOD

(75) Inventors: Omar Dewan, Overland Park, KS (US); Shrikant Jannu, Olathe, KS (US); Dora Potluri, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 445 days.

(21) Appl. No.: 10/738,542

(22) Filed: Dec. 17, 2003

(51) Int. Cl.
*G06F 17/00* (2006.01)
*G06F 7/00* (2006.01)

(52) U.S. Cl. .............................. 707/104.1; 101/103 R; 101/3

(58) Field of Classification Search .............. 707/3, 707/103 R, 101, 104.1
See application file for complete search history.

(56) References Cited

U.S. PATENT DOCUMENTS

| | | | |
|---|---|---|---|
| 5,873,092 A | 2/1999 | Cheng et al. .................. 707/103 |
| 5,987,471 A * | 11/1999 | Bodine et al. ............ 707/103 R |
| 6,044,379 A | 3/2000 | Callsen ......................... 707/103 |
| 6,085,030 A | 7/2000 | Whitehead et al. ...... 395/200.33 |
| 6,085,188 A | 7/2000 | Bachmann et al. ............. 707/3 |
| 6,092,178 A | 7/2000 | Jindal et al. ................... 712/27 |
| 6,167,427 A | 12/2000 | Rabinovich et al. ......... 709/201 |
| 6,324,580 B1 | 11/2001 | Jindal et al. .................. 709/228 |
| 6,327,622 B1 | 12/2001 | Jindal et al. .................. 709/228 |
| 6,351,775 B1 | 2/2002 | Yu ............................... 709/238 |
| 6,360,256 B1 | 3/2002 | Lim ............................. 709/223 |
| 6,438,590 B1 | 8/2002 | Gartner et al. ............... 709/219 |
| 6,453,320 B1 | 9/2002 | Kukura et al. ........... 707/103 R |
| 6,510,450 B1 * | 1/2003 | Ricart et al. ................. 709/203 |
| 6,529,947 B1 | 3/2003 | Feuerman ..................... 709/217 |
| 6,571,274 B1 | 5/2003 | Jacobs et al. ................ 709/203 |
| 6,578,050 B1 | 6/2003 | Daggubati et al. ........ 707/104.1 |
| 7,020,697 B1 * | 3/2006 | Goodman et al. ........... 709/223 |
| 7,036,127 B2 * | 4/2006 | Cheng et al. ................. 719/315 |
| 2001/0052016 A1 | 12/2001 | Skene et al. ................. 709/226 |
| 2002/0099970 A1 | 7/2002 | Zhao et al. ...................... 714/4 |
| 2002/0129134 A1 | 9/2002 | Leighton et al. ............. 709/223 |
| 2003/0018701 A1 * | 1/2003 | Kaestle et al. ............... 709/201 |
| 2003/0067912 A1 | 4/2003 | Mead et al. .................. 370/389 |
| 2005/0015401 A1 * | 1/2005 | Chang et al. ............ 707/103 R |

OTHER PUBLICATIONS

Christof Dallermassl: Aspects of Integration of Heterogeneous Server Systems in Intranets—the Java Approach, Graz University of Technology, Graz, November 1999.*

(Continued)

*Primary Examiner*—Kuen S. Lu

(57) ABSTRACT

A naming service for locating a service in an enterprise is provided. The naming service comprising a binding module to associate a first service with a location of an interface maintaining a reference to the first service, the binding module further operable to associate a second service with a location of the second service. The naming service further comprising a look-up module operative to provide the location of the interface in response to a request by an application for the first service, the look-up module further operable to provide the location of the second service in response to a request by a second application. A method for locating a service in an enterprise is also provided.

23 Claims, 4 Drawing Sheets

OTHER PUBLICATIONS

Barlen et al.: Implementation and Pratical Use of LDAP on the IBM @server iSeries Server, Apr. 2002, IBM.*

Ariella Richman and Doan Hoang, *Accomplishing Distrubuted Traders Utilising the X.500 Directory*, Basser Department of Computer Science, University of Sydney, NSW 2006 Australia, 7 pgs.

Ivan Chow, et al., *Method and Apparatus for Implementing CORBA Complaint Name Services Incorporating Load Balancing Features*, U.S. Appl. No. 09/585,530, filed Jun. 1, 2000; 48 pgs.

*Directory-Enabled Computing: The Directory's Expanding Role*, Dec. 28, 1999, The Burton Group Network Strategy Overview, 48 pgs.

*Comparing Directories and Relational Databases: Not a Zero-Sum Game*, Jan. 25, 2000, The Burton Group Network Strategy Overview, 28 pgs.

*Trader Cooperation to Enable Object Sharing Among Users of Homogenous Distributed Systems*, Jul. 1994, Ni, Y, pp. 1-16.

*A property-based Clustering Approach for the CORBA Trading Service*, 1999, Craske, G., pp. 1-9.

* cited by examiner

ENTERPRISE NAMING SERVICE SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to methods and apparatuses for name services in distributed object systems, and more particularly, but not by way of limitation, to methods and apparatuses for implementing a unified name service.

BACKGROUND OF THE INVENTION

Enterprise software systems may comprise many independent computer programs, applications, modules, or components. These applications may execute in a distributed manner on several different computers. Applications often require the services provided by other applications. A first application requesting a service from a second application may be said to act in a client role while the second application may be said to act in a server role. The first application may provide services to yet other applications and may in that case act in a server role. The intercommunicating applications may be executing on computers located far apart and in different divisions of the company.

The address or location of these services and servers may be maintained, such as by hard-coding, in client modules. When a server is relocated, perhaps to a different computer system to distribute loads evenly among multiple computer systems, the code on the client module must be changed to employ the new address of the server. When the client code is changed it must be installed and brought into service, in some cases interrupting operations, if only temporarily. The address or location of these services and servers may alternately be provided as a file entry, as in a configuration file or an initialization file. In this case, when a server is relocated the configuration or initialization files must be updated to reflect the new location of the service and or server.

SUMMARY OF THE INVENTION

The present embodiment provides a naming service for locating a service in an enterprise. The naming service comprising a binding module to associate a first service with a location of an interface maintaining a reference to the first service, the binding module further operable to associate a second service with a location of the second service. The naming service further comprising a look-up module operative to provide the location of the interface in response to a request by an application for the first service, the look-up module further operable to provide the location of the second service in response to a request by a second application.

In one embodiment of the naming service, the binder module is operable to associate the name of a JAVA service object to the location of a JAVA naming and directory interface having a reference to the JAVA service object. A name look-up module is operable to provide a requesting application with the remote JAVA naming and directory service. The location information, for example may contain the provider url, initial context factory, the associated JAVA naming and directory interface and/or the full home interface name.

In another embodiment, the binder module is operable to associate the name of a CORBA object to an address or reference to the CORBA object, and a name look-up module is operable to use the association to provide the address or reference of the CORBA object to an application which has requested the look-up information of the CORBA object. The application may then use this CORBA object address or reference to directly invoke the services of the CORBA object.

In one embodiment an enterprise naming service for applications to locate services is provided. The enterprise naming service for applications to locate services comprises a binding module to associate an interface maintaining a reference to a first service with a location of the interface, the binding module further operable to associate a second service with a location of the second service and a look-up module to provide the location of the interface in response to a request by an application, the look-up module further operable to provide the location of the second service in response to a request by a second application. For example, in one embodiment of the naming service for applications to locate services, the binder module associates a JAVA naming and directory interface service maintaining an address or universal reference locator of an enterprise JAVA bean with the address or universal reference locator of the JAVA naming and directory interface service, and the look-up module provides the address or universal reference locator of the JAVA naming and directory interface service in response to a request by an application for information on how to access the enterprise JAVA bean. In another example, in one embodiment the binder module is operable to associate the name of a CORBA object to an address or reference to the CORBA object, and the name look-up module is operable to use the association to provide the address or reference of the CORBA object to an application which has requested the look-up information of the CORBA object. The application may then use this CORBA object address or reference to directly invoke the services of the CORBA object.

In still another embodiment, a method for locating a service in an enterprise is provided. The method comprises associating a service with a location with an interface maintaining a reference to a service. The method includes requesting, by an application desiring to employ the service, the location of the service, and returning the location of the interface to the application.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Figure 1:
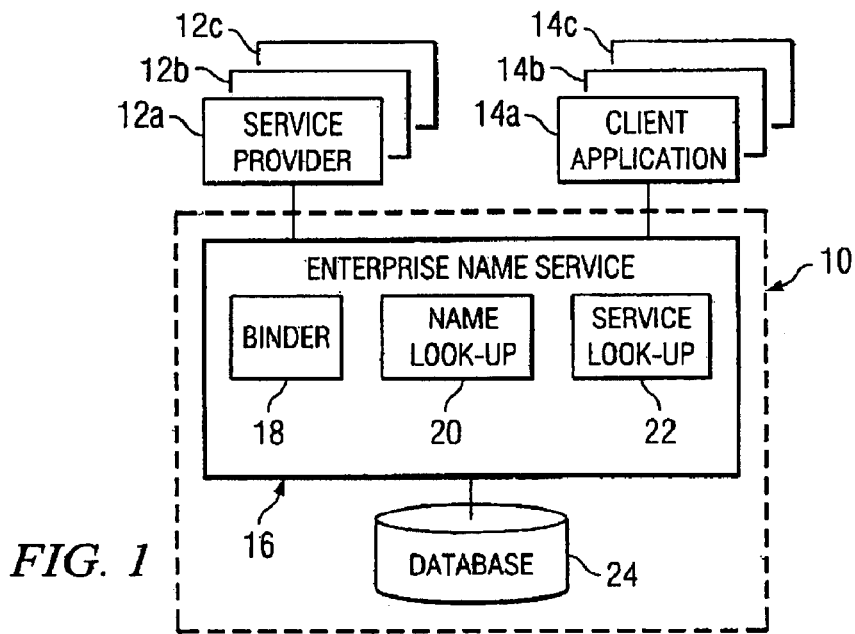
FIG. 1 is a block diagram of an enterprise name service system according to one embodiment.

Turning now to FIG. 1 a block diagram of an enterprise name service (ENS) system 10 is depicted. Service providers 12a, 12b, and 12c are computer programs or applications which provide services to client applications 14a, 14b, and 14c. In some cases the service providers 12 may be interfaces which provide a mechanism for finding service objects, for example enterprise JAVA bean objects, which may fulfill the request of the client application 14. The ENS system 10 provides service location transparency, for example, the service providers 12 may be relocated, and the client application 14 need not change its behavior when employing the ENS system 10 to find the service objects.

Stated in another way, of particular relevance to the present disclosure is the potential of addressing a number of different environments or domains within an enterprise in an integrated and cost effective manner. An embodiment of the present disclosure provides a single name look-up service which provides access to name look-up for some domains directly, while for other domains provides a response to the name look up which provides a reference to the interface of a local name service for that domain. In this manner, efficiency may be gained by allowing clients throughout the enterprise to go to a single name service regardless of domain (providing the desired transparency), while at the same time reducing the need to recreate every potential name look-up for every domain in one omnibus application. One specific example of this approach is demonstrated below as object references in the CORBA domain are provided directly, while name look-ups in a JAVA domain are provided a reference to the interface of a JAVA naming and directory service having appropriate references for the desired name look-ups in the desired JAVA domain.

In some cases, the client applications 14 access the services supported by the service providers 12 by invoking methods or function calls of application programming interfaces (APIs) provided by the service providers 12. In order to invoke these methods or function calls the client application 14 may need to know the location or address of the service provider 12. The ENS system 10 provides a mechanism for client applications 14 to look up the location or address of the service provider 12 at the time the client application 14 wishes to access the service supported by the service provider 12.

An enterprise name service (ENS) 16 comprises a binder module 18, a name look-up module 20, and a service look-up module 22. When brought into service, for example on start-up, the service provider 12 registers information with the enterprise naming service 16. This may be termed binding. This information may be an address or a location, a name, and a service type of the service provider 12. The binder module 18 creates a mapping which associates together the location, name, and service type of the service provider 12. This association or mapping is termed a binding, for example the name of the service provider 12 is said to be bound to the location and the service type of the service provider 12 via this association, mapping, or binding. The binding is stored in a datastore 24 which is accessible to the binder module 18, the name look-up module 20, and the service look-up module 22.

The service providers 12, the client applications 14, and the ENS 16 are computer programs or applications which may execute on a general purpose computer system. General purpose computer systems are discussed further hereinafter.

If the service provider 12 is relocated to execute on a different computer such that the old binding of the name of the service provider 12 with the location and the service type of the service provider 12 becomes invalid, the service provider 12 should rebind. Rebinding may involve deleting the former mapping or binding created for the service provider 12 and then creating a new mapping or binding with the new location of the service provider 12. Alternately, rebinding may involve revising the former mapping or binding.

When the service provider 12 is taken out of service, for example on shut-down, the service provider 12 unbinds its services. Unbinding is the operation of removing the effect of binding or registering. When the service provider 12 unbinds, the binder module 18 removes or marks as invalid the mappings or bindings created earlier.

It is the responsibility of the service providers 12 to keep their bindings current and up-to-date. Binding and rebinding is accomplished by the service providers 12 invoking functions provided by an ENS API.

Binding information which is provided by service providers 12 may vary substantially among different service types. Some example bindings are provided below. An enterprise JAVA bean (EJB) binding may comprise a service name, a type, a version, a provider universal reference locator, an initial context factory, a JAVA name and directory interface (JNDI) name, and a full home interface. An example EJB binding is:

servicename=EJBServicePlanManager
type=EJB
version=1.0
provider_url=t3://localhost:9631
initial_context_factory=weblogic.jndi.WLInitialContextFactory jndi_name=ExamplePlanManager
full_home_interface=com.acme.enterprise.example.Plan
ManagerHome A JAVA messaging service (JMS) queue connection factory (QCF) binding may comprise a service name, a type, a version, a queue manager, a hostname, a port, and a channel. An example JMS QCF binding is:
servicename=QCF_EMR2DAV
type=JMS
version=1.0
qmgr=EMR2DAV
hostname=205.50.183.65
port=4231
channel=SYSTEM.DEF.SVRCONN A JMS queue binding may comprise a service name, a type, a version, a queue manager, a queue, and a target client. An example JMS queue binding is:
servicename=Q_CLIENT
type=JMS
version=1.0
qmgr=EMR2DAV
queue=CLIENT
target_client=MQ A JAVA messaging service (JMS) Topic connection factory (TCF) binding may comprise a service name, a type, a version, a queue manager, a broker queue manager, a hostname, a port, and a channel. An example JMS TCF binding is:
servicename=TCF_EMR3DAV
type=JMS_TCF
version=1.0
qmgr=EMR3DAV
brkmgr=EMR3DAV
hostname=205.50.183.66
port=4232
channel=SYSTEM.DEF.SVRCONN A JMS queue binding may comprise a service name, a type, a version, and a topic name. An example JMS Topic binding is:
servicename=T_CLIENT
type=JMS_T
version=1.0
tname=CLIENT Note that the above bindings are only exemplary. In some embodiments other bindings and other service types may be employed.

When invoking a service or interface supported by the service provider 12 the client application 14 looks-up the service provider 12 through the ENS 16 by invoking functions provided by the ENS API. The client application 14 may look-up the service provider 12 by name. In this case, the client application 14 provides the name of the service provider 12 to the name look-up module 20, and the name look-up module 20 returns the location of the service provider 12. The name look-up module 20 employs the name provided by the client application 14 to search in the datastore 24 for the mapping of this name to the location of the service provider 12.

The client application 14 may also look-up the service provider 12 by service type. This is sometimes referred to as a trading service, but for the purposes of this application may also be referred to more generally as a naming service, as the deliverables are still names, it is the way in which they are requested which is distinct. In this case, the client application 14 provides the type of service provider 12 to the service look-up module 22, and the service look-up module 22 provides the names of all service providers 12 whose service type matches the service type provided by the client application. The client application 14 may then employ the one or more names returned by the service look-up module 22, by performing a look-up by name via the enterprise naming service 16, to obtain locations of the service providers 12 associated with the names. In some embodiments, the service look-up module 22 may provide both the names and locations of all service providers 12 whose service type matches the service type provided by the client application 14, thus saving the step of having to make a series of name look-ups via the name look-up module 20 to obtain locations of the service providers 12.

The client application 14 may employ criteria to select one of several service providers 12 identified through the service look-up. In some embodiments, the service look-up module 22 may employ a criteria, for example selecting the least recently used service provider 12, to select a single service provider 12 and to return the location or address of this single service provider 12 to the client application 14. For example, the service look-up module 22 may employ some algorithm to distribute processing loads evenly among several service providers 12 supporting the same service type.

The service providers 12 need to bind when they initialize and to rebind when they relocate. The client applications 14 need to look-up the location of the service provider 12 every time they access a service or interface supported by the service provider 12.

The ENS system 10 supports service location transparency for the client applications 14. The service provider 12 may be relocated arbitrarily, and the client application 14 need not change its behavior when employing this ENS system 10. The ENS system 10 is a unified naming service, for example applications 14 needing access to multiple service providers 12 need resort only to the single ENS system 10 to obtain the information necessary to access the service providers 12. By contrast, for example, if multiple JAVA 2000 enterprise edition (J2EE) interfaces were to be accessed by a client application 14, the client application would need to know the universal reference locator (URL) of each JAVA naming and directory interface (JNDI) associated with each separate J2EE interface since there is no unified J2EE repository for names at this time.

In some embodiments the ENS system 10 supports versioning of service providers 12. In this case, the ENS system 10 can support running multiple versions of service providers 12 in the same system and permits client applications 14 to select the version of service provider 12 desired. Recall that some service providers 12 may be interfaces which provide a mechanism for finding service objects. When versioning is supported, the service provider 12 provides version information when binding and rebinding, and client applications 14 may specify a version identifier when looking-up the service provider 12. When the client application 14 omits the version identifier when looking-up the service provider 12, the name look-up module 20 returns the service provider 12 with the latest version identifier which matches the name.

Similarly, the client application 14 may specify a version identifier when looking-up by service type, and the service look-up module 22 returns all service providers 12 having the specified version and having the specified service type. If the client application 14 omits the version identifier when looking-up by service type, the service look-up module 22 returns all service providers 12 at the latest version and having the specified service type.

The communication protocol or object access mechanism employed by the client application 14 to access the services or interfaces provided by the service provider 12 determines which of several APIs supported by the ENS 16 that the client application 14 employs. CORBA objects are bound and looked-up via a CORBA COS naming interface. JAVA message queue (MQ) objects and JAVA 2000 enterprise edition (J2EE) interfaces are bound and looked-up via a JAVA ENS API. WebServices are bound and looked-up via a universal description discovery and integration (UDDI) ENS API. For example, if the client application 14 needs to access an object made accessible to it via CORBA, the client application 14 interacts with the ENS 16 via the CORBA COS naming interface. As a second example, if the client application 14 needs to access an enterprise JAVA bean (EJB) object, the client application 14 interacts with the ENS 16 via the JAVA ENS API.

When a CORBA object is requested, the ENS system 10 returns the object reference. With this object reference, the client application 14 may invoke the needed service directly on the object. The service version concept described above may be applied to CORBA objects as well. In some embodiments, a service provider 12 may provide object version information when binding and rebinding its CORBA objects, and the client application 14 may specify object version information when looking-up CORBA objects.

For requests for other non-CORBA services, the ENS system 10 returns meta-information which allows the client application 14 to communicate directly with the service provider 12. In some cases, helper classes may be supported to make accessing the services or interface of the service provider 12 more convenient.

Figure 2:
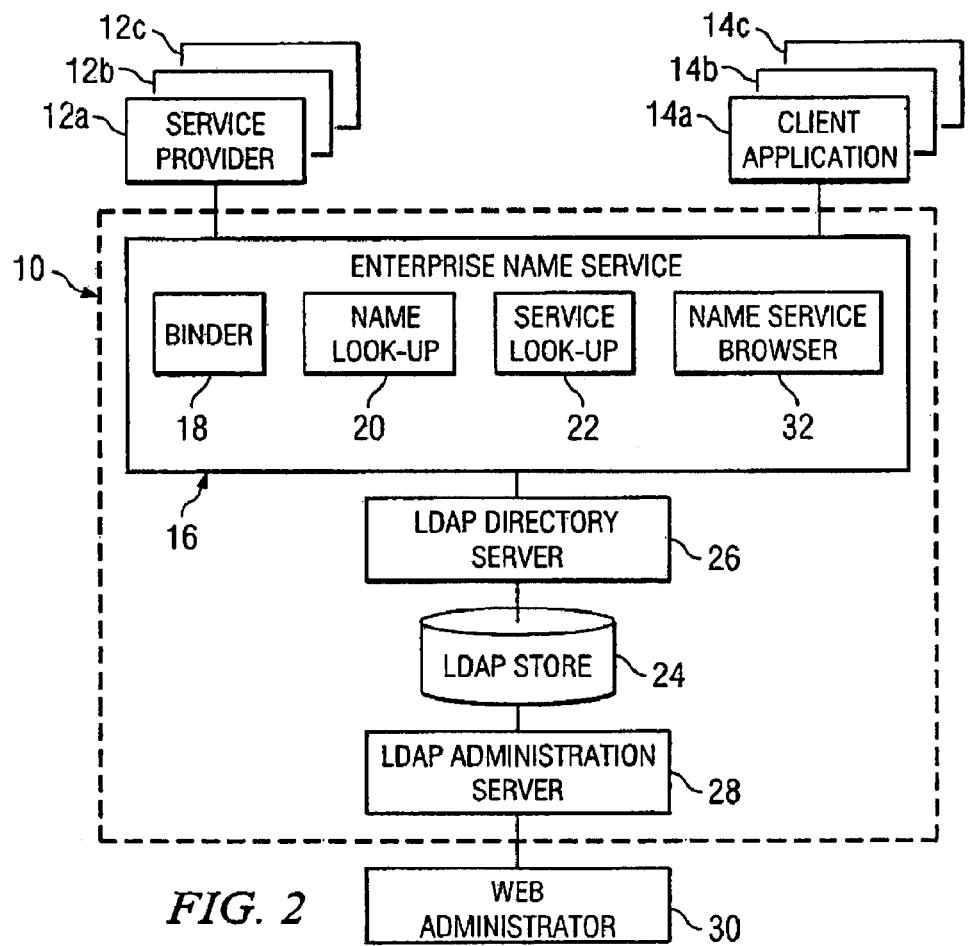
FIG. 2 is a block diagram of an enterprise name service system according to another embodiment.

Turning now to FIG. 2, another embodiment of the ENS system 10 is depicted. A lightweight directory protocol (LDAP) directory service is employed for accessing and organizing the datastore 24 in this embodiment. LDAP supports faster reads than writes, and in the ENS system 10 there should be more read operations than write operations. A LDAP server 26 communicates with the ENS 16 via LDAP protocol. A LDAP administration server 28 interacts with the LDAP datastore 24 and provides a central console accessible to a web administrator 30. The LDAP administration server 28 may be software provided by the vendor who may supply the LDAP store 24. The LDAP administration server provides an administrative interface to maintain the LDAP store directly. This may be useful to manually change entries and to perform occasional manual clean-up. For example, sometimes it may be necessary to delete stale or outdated references in the LDAP store 24 if a service provider 12 crashes and is not able to unbind its services. In other embodiments, the datastore 24 may be a relational database or other database structure rather than a LDAP based datastore.

A name service browser 32 supports a hypertext markup language (HTML) world wide web interface that allows access by client applications 14 or service providers 12 to obtain a variety of service status information. The Name service browser 32 is capable of displaying a CORBA web interface and a JAVA web interface. The CORBA web interface provides a list of bound services and allows client applications 14 or service providers 12 to further explore and look into the details, as well as to ping the status of those services. The JAVA web interface provides the capability to search services by service name, version, and other attributes. The name service browser 32 is a useful tool for application administrators and service providers who bind the services, as well as clients who look-up the services. For example, the name service browser 32 provides a variety of useful functionality including the ability to be queried for available EJB services, querying if a specified service is running, identifying all or some server instances, and determining where a service is located, for example. The client application 14 or service provider 12 sends a request message to the name service browser 32, the name service browser 32 performs operations to obtain the requested information, and the name service browser 32 returns the information to the requester.

Figure 3:
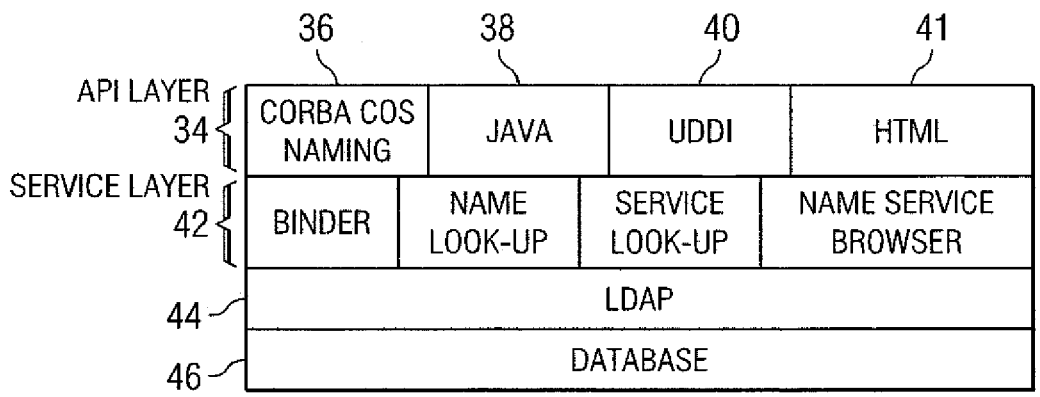
FIG. 3 is a block diagram representing the enterprise name service as a series of cooperating layers.

Turning now to FIG. 3, the ENS system 10 is depicted as a layered stack of intercommunicating modules. An API layer 34 comprises the CORBA COS naming API 36, the JAVA ENS API 38, the UDDI ENS API 40, and the HTML interface. Service providers 12 bind and rebind their services and client applications 14 look-up services using one of these three APIs 36, 38, 40. Service providers 12 and client applications 14 may send a query to the name service browser 32 through the HTML interface. A service layer 42 comprises the binder module 18, the name look-up module 20, the service look-up module 22, and the name service browser 32. The API layer 34 invokes the services of the service layer 42 to complete the API functions or methods invoked by the service providers 12 and client applications 14. A LDAP layer 44 provides LDAP services. The service layer 42 invokes the services of the LDAP layer 44 to complete the functions or methods invoked by the API layer 34. A datastore layer 46 provides datastore services. The LDAP layer 44 interacts with the datastore layer 46 to complete the functions or methods invoked by the service layer 42.

Figure 4:
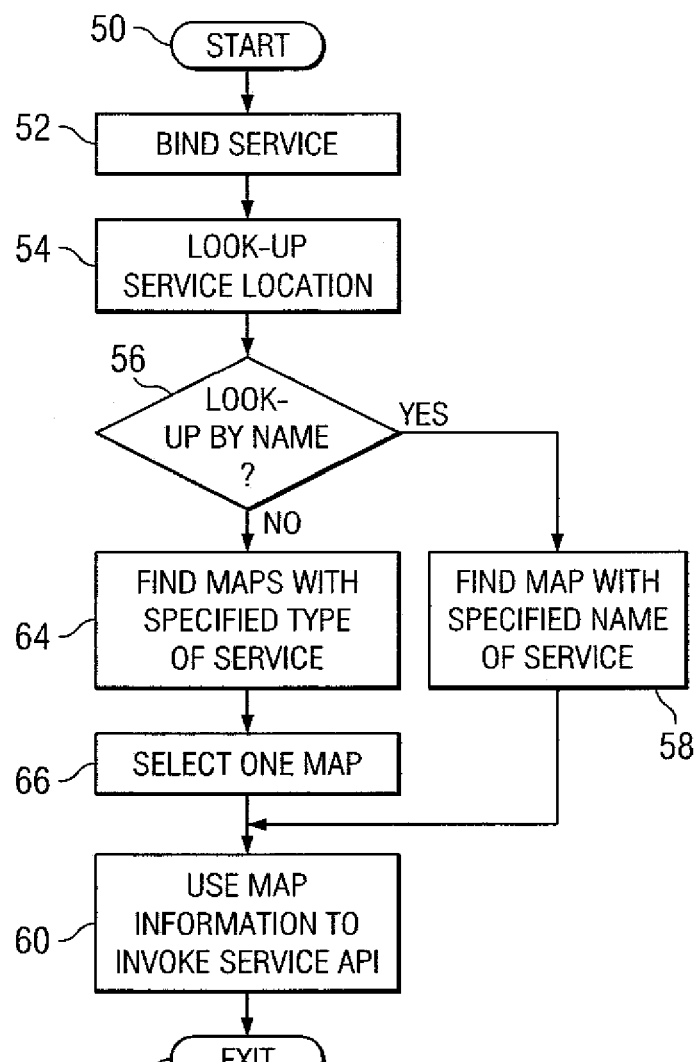
FIG. 4 is a flow chart for a method of looking up services in an enterprise name service system.

Turning to FIG. 4, a flow chart of a service provider 12 location look-up is depicted. The process begins at block 50 and proceeds to block 52 where a service provider 12 provides a binding for its services. This involves providing a name, a location or address, and a service type. In some embodiments this also involves providing version information. The name, location or address, service type, and, optionally, the version information, are associated together in a map or a binding.

The process proceeds to block 54 where a client application 14 requests the look-up of the service location. The process proceeds to block 56 where a decision is made. If this is a name look-up, the process proceeds to block 58 where the map associated with the specified name is searched for and found. The process proceeds to block 60 where the map information is employed by the requesting client application 14 to invoke the API of the service provider 12. The process proceeds to block 62 where the process exits.

If at block 56 a service type look-up is requested, the process proceeds to block 64 where the maps associated with the specified service type are searched for and found. The process proceeds to block 66 where one map from potentially many maps associated with the specified service type is selected. The process proceeds to step 60 where the selected map information is employed by the requesting client application 14 to invoke the API of the service provider 12. The process proceeds to block 62 where the process exits.

Figure 5A:
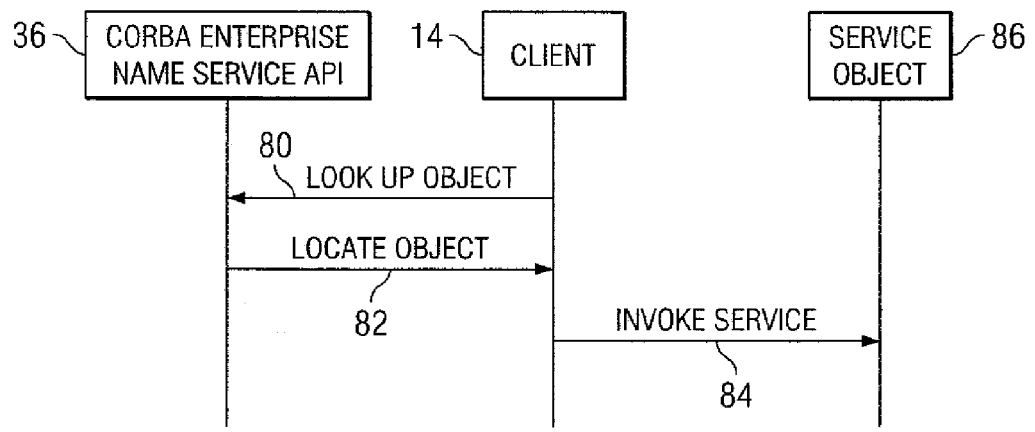
FIG. 5A illustrates a sequence diagram of messages employed to access a CORBA based object through the enterprise name service system.

Turning now to FIG. 5A, a message sequence diagram illustrates a typical CORBA object access using the ENS system 10 CORBA COS naming interface. The client application 14 sends a lookupObject message 80 to the ENS system 10. The ENS system 10 looks-up the specified object and returns a reference to the object in a locateObject message 82 to the client application 14. The client application 14 sends an invokeService message 84 to the object, referred to as a service object 86, using the reference to the object. Note that sending a message is synonymous with invoking a function or method.

Figure 5B:
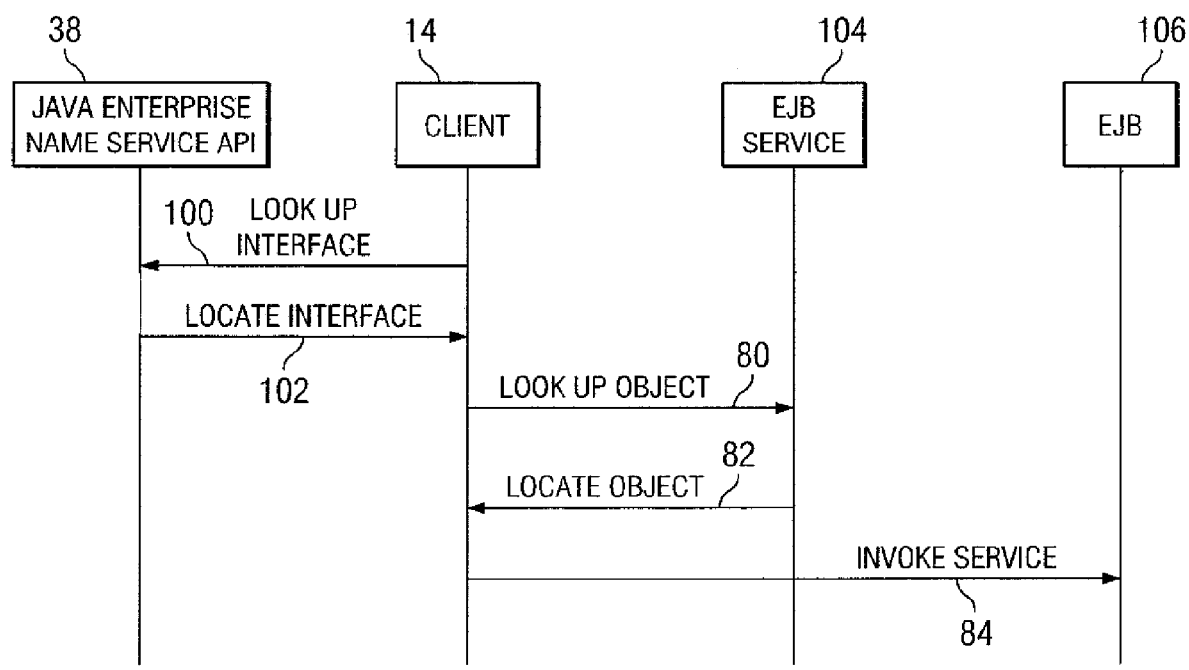
FIG. 5B illustrates a sequence diagram of messages employed to access an enterprise JAVA bean object through the enterprise name service system.

Turning now to FIG. 5B, a message sequence diagram illustrates a typical EJB object access using the ENS system 10. The client application 14 sends a lookupInterface message 100 to the ENS system 10. The ENS system 10 looks-up the specified interface and returns metadata in a locateInterface message 102 to the client application 14. The client application 14 employs the metadata to determine how to access the interface, here an EJB service 104, and sends a lookupObject message 80 to the EJB service 104. The EJB service 104 looks-up the specified object and returns information necessary to communicate with the object via a locateObject message 82 to the client application 14. The client application 14 sends an invokeService message 84 to the EJB 106. Note that the message names above are exemplary and in practice other names may be used or other variant message sequences may be used.

Figure 5C:
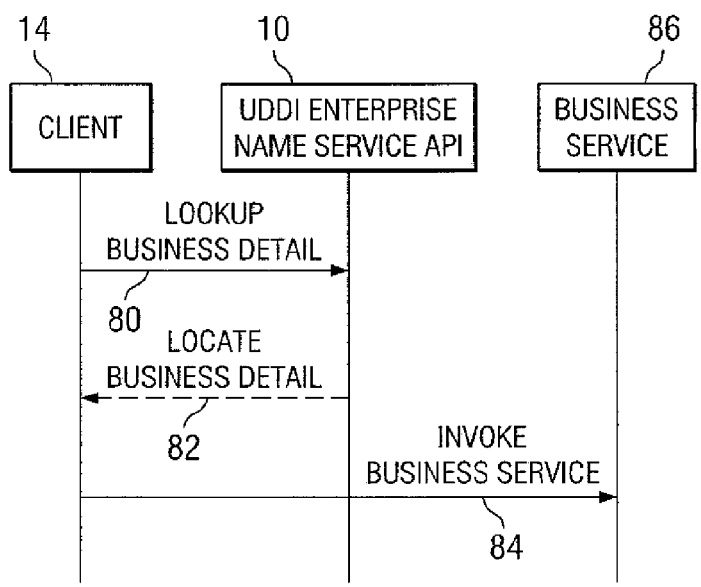
FIG. 5C illustrates a sequence diagram of another method of employing messages through the enterprise name service system.

Turning now to FIG. 5C, a message sequence diagram illustrates a typical Web Service and other Business Service access using the UDDI ENS system 10. The client application 14 sends a lookup Business Detail message 80 to the ENS system 10. The ENS system 10 looks-up the specified Business Detail and returns the information on the Business Details in a locate Business Detail message 82 to the client application 14. The client application 14 sends an invoke Business Service message 84 to invoke the Business Service, referred to as a business service 86. Note that sending a message is synonymous with invoking a function or method.

The above three described sequence diagrams illustrate the service location transparency supported by the ENS system 10. The location of the service provider 12 may be changed without effecting the behavior of the client applications 14.

Figure 6:
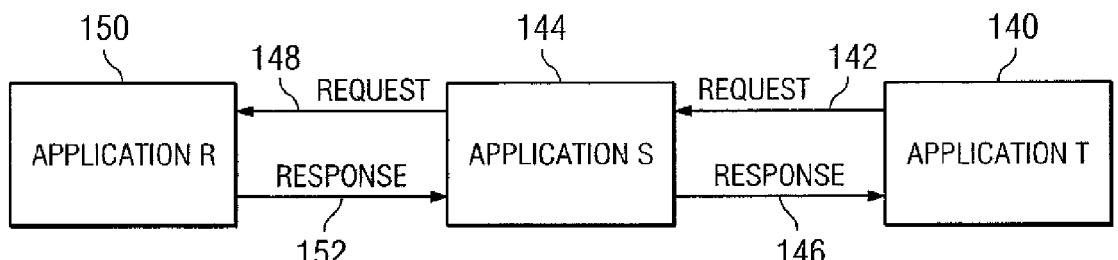
FIG. 6 illustrates an application sharing the roles of both a service provider and a client application.

Note that some applications may act in the role of service provider 12 relative to one application but act in the role of a client application 14 relative to another application. Turning to FIG. 6, for example, application T 140 may request a service named services by sending a requestServiceS message 142 to application S 144, application S 144 may perform services, and application S 144 may send a serviceSPerformed message 146 to application T 140 to satisfy the request for services. In this example application S 144 acts as a service provider 12 relative to application T 140 which acts as a client application 14. At the same time, application S 144 may request a service named serviceR by sending a requestServiceR message 148 to application R 150, application R 150 may perform serviceR, and application R 150 may send a serviceRPerformed message 152 to application S 144 to satisfy the request for serviceR. In this example application S 144 acts as a client application 14 relative to application R 150 which acts as a service provider 12.

Figure 7:
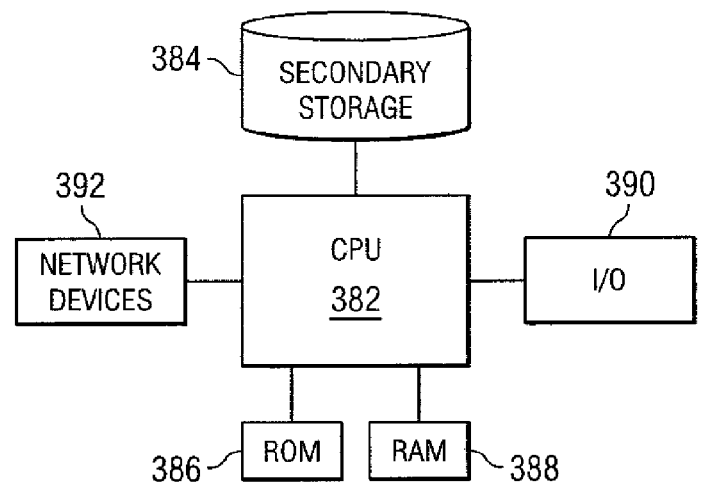
FIG. 7 illustrates an exemplary general purpose computer system suitable for implementing the several embodiments of the enterprise name service system.

The ENS system 10 described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

In one embodiment the ENS system 10 described above is flexible and extensible to existing and emerging technologies, and supports service provider 12 location transparency, enabling easy relocation of service providers 12 to distribute loads across computer systems.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What we claim as our invention is:

1. A naming service, operating on at least one computer within a network of computers, for locating a service in an enterprise, comprising:
    a first module maintaining a location of an interface, the interface having a reference to a service; and
    a second module providing the location of the interface to an application in response to receiving a request from the application for the location of the service;
    wherein the naming service provides service location transparency such that the location of the service can be changed without affecting the behavior of the application;
    wherein the service is further defined as a service object;
    wherein the service object is further defined as a JAVA service object and
        wherein the interface is further defined as a JAVA directory and naming interface; and
    wherein the first module further maintains a second location associated with a second service,
        the second module further providing the second location to a second application in response to receiving a request for the second service from the second application, and
        the second application operating on at least one computer within a network of computers using the second location to use the service.

2. The naming service of claim 1, wherein the application uses the interface to invoke the service, using the location of the interface.

3. The naming service of claim 1, wherein the service object is selected from a group of service objects including an enterprise JAVA Bean, a queue, and a queue manager.

4. The naming service of claim 1, wherein the second service is a service object and wherein the second location is useful by the application to directly invoke the services.

5. The naming service of claim 4, wherein the second location is selected from a group of locations including an address and reference location.

6. The naming service of claim 1, wherein first module further maintains an identifier corresponding to the service and associates the identifier with the location of the interface.

7. The naming service of claim 6, wherein the identifier is a service type of the service.

8. The naming service of claim 6, wherein the identifier includes is a name and a service type associated with the service.

9. The naming service of claim 1, wherein the interface is a server and the application is a client of the server, the client using the server to provide the service to the client.

10. The naming service of claim 1, wherein the second module returns meta-information to the application, the meta-information including a reference useful by the application for employing the service.

11. The naming service of claim 1, wherein the service is a server maintaining a plurality of classes and a plurality of objects, at least one of the objects useful by the application.

12. The naming service of claim 1, wherein first module stores the location of the interface in a datastore.

13. The naming service claim 12, wherein the datastore is further defined as a lightweight directory access protocol based datastore.

14. The naming service of claim 1, further including a third module which stores a service status information related to the service, the third module searching and returning the service status information related to the service in response to a request.

15. The naming service of claim 14, wherein a hypertext markup language interface is employed to communicate with the third module.

16. The naming service of claim 15, wherein the third module is defined as a name service browser.

17. An enterprise naming service, operating on at least one computer within a network of computers, for applications to locate services, comprising:
    a binding module to associate a first service with a location of an interface maintaining a reference to the first service, the binding module further associating a second service with a location of an interface maintaining a reference to the second service; and
    a look-up module operating on at least one computer within a network of computers providing the location of the interface of the first service to a first application in response to a request by the first application for the first service,
        wherein the look-up module further providing the location of the interface of the second service in response to a request by a second application for the second service;
    wherein the enterprise naming service provides service location transparency such that the location of a service can be changed without affecting the behavior of an application;
    wherein the first service is a service object and the second service is a Common Object Request Broker Architecture object;
    further comprising a name service browser module operating on at least one computer within a network of computers maintaining a service status information related to one of the first and second services, the name service browser searching and returning the service status information of one of the first and second services in response to a request;
    wherein the binding module further maintains a version identifier associated with at least one of the first and second service, and wherein a plurality of versions of at least one of the first and second services are maintained.

18. The enterprise naming service of claim 17, wherein the interface is a JAVA Naming and Directory Interface and wherein the first service is a JAVA service object.

19. The enterprise naming service of claim 17, wherein the look-up module further returns the location associated to a first version of the first service.

20. The enterprise naming service of claim 19, wherein the look-up module further returns the location associated to a first version of the second service.

21. A computer-implemented method for locating a service in an enterprise, comprising:
    associating a service with a location with an interface maintaining a reference to a service;
    requesting, by an application desiring to employ the service, the location of the service;
    returning the location of the interface to the application;
    using the location to promote communication between the application and the interface;
    the application requesting the service from the interface; and the application using the service implemented on at least one computer;

wherein the application uses a service identifier to request the location of the service;

wherein the service is further defined as an Enterprise JAVA Bean and the interface is further defined as a JAVA Naming Directory Interface; and wherein the method provides service location transparency such that the location of the service can be changed without affecting the behavior of the application.

22. The method of claim 21, wherein the method further comprising associating an identifier, a version and a second location with a Common Object Request Broker Architecture object.

23. The method of claim 22, wherein the method further comprises:

requesting the second location of the Common Object Request Broker Architecture object using the identifier and version of the Common Object Request Broker Architecture object;

returning the second location of the Common Object Request Broker Architecture object based on the identifier and version of the Common Object Request Broker Architecture object;

connecting to the Common Object Request Broker Architecture object using the second location; and employing the Common Object Request Broker Architecture object at the second location.

* * * * *